United States Patent
Blanche et al.

(10) Patent No.: US 11,869,207 B2
(45) Date of Patent: Jan. 9, 2024

(54) DETERMINATION OF A TRUE SHAPE OF AN OBJECT BASED ON TRANSFORMATION OF ITS OPTICAL IMAGE

(71) Applicant: ARIZONA BOARD OF REGENTS ON BEHALF OF THE UNIVERSITY OF ARIZONA, Tucson, AZ (US)

(72) Inventors: Pierre Alexandre Blanche, Tucson, AZ (US); Pedro Alcaraz, Tucson, AZ (US); Remington Spencer Ketchum, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 18/035,879

(22) PCT Filed: Oct. 28, 2021

(86) PCT No.: PCT/US2021/056972
§ 371 (c)(1),
(2) Date: May 8, 2023

(87) PCT Pub. No.: WO2022/103587
PCT Pub. Date: May 19, 2022

(65) Prior Publication Data
US 2023/0326057 A1 Oct. 12, 2023

Related U.S. Application Data

(60) Provisional application No. 63/111,294, filed on Nov. 9, 2020.

(51) Int. Cl.
*G06T 5/00* (2006.01)
*G06T 7/55* (2017.01)
(Continued)

(52) U.S. Cl.
CPC ................ *G06T 7/55* (2017.01); *G06T 5/002* (2013.01); *G06T 5/10* (2013.01); *G06T 7/13* (2017.01)

(58) Field of Classification Search
CPC .. G06T 7/55; G06T 5/002; G06T 5/10; G06T 7/13; G06T 1/0014; G06T 17/00;
(Continued)

(56) References Cited

U.S. PATENT DOCUMENTS

2009/0238449 A1* 9/2009 Zhang ..................... G06T 7/521
382/165
2011/0080471 A1* 4/2011 Song ....................... G06T 7/521
356/627
(Continued)

FOREIGN PATENT DOCUMENTS

| CN | 109472834 A | * 3/2019 | ............. G06T 5/002 |
| CN | 111238403 A | 1/2020 | |
| JP | 187348 A | 10/2017 | |

OTHER PUBLICATIONS

Weijie Shi, Yongjian Zhu, Yong Yao; "Discussion about the DCT/FFT phase-unwrapping algorithm for interferometric applications," Science Direct, Optik 121 (2010) 1443-1449.
(Continued)

*Primary Examiner* — Jose L Couso
(74) *Attorney, Agent, or Firm* — Quarles & Brady LLP; Yakov S. Sidorin

(57) ABSTRACT

Methodology of unwrapping of phase from an optical image in the presence of both noise and unreliable phase fringes configured to tackle both problems simultaneously and, in the most efficient of multiple related implementations, including at least three prongs: i) SD-ROM based denoising procedure, ii) reliable estimation of the gradient of both the wrapped and unwrapped phase with the use of the forward and inverse Laplacian operators; and iii) fringe quality
(Continued)

improvement with the use of Fuzzy Logic based Edge Detection. Transformation of optical images with the use of such methodology to provide an image representing visually-perceivable representation of the object's shape. Computer program product configured to implement the same.

18 Claims, 8 Drawing Sheets

(51) Int. Cl.
    *G06T 7/13*     (2017.01)
    *G06T 5/10*     (2006.01)
(58) Field of Classification Search
    CPC ......... G06T 2207/10012; G06T 7/0006; G06T 7/21; G06T 7/0004; G06T 7/586; G06T 3/0068; G06T 5/50; G06T 2207/20056; G06T 2207/20221; G06T 7/37; G06T 7/32; G06T 7/521; G06T 7/40; G06T 2207/10056; G01S 13/90; G01S 13/00; G01S 13/88; G01S 13/865; G01S 11/25; G01S 13/9011; G01S 13/885; G01S 7/411; G01S 17/89; G01S 17/88; G01S 17/006; G01S 7/4865; G01S 7/41; G01B 11/25; G01B 11/2441; G01B 2290/70; G01B 9/02044; G01B 9/02083; G01B 9/0209; G01B 9/02091; G02B 21/0056; G02B 21/14; G02B 21/367; G02B 2207/125; G02B 27/0087; G01N 2021/8829; G01N 2021/1787; G01N 21/45; G01N 21/8806; G01N 23/041; G01N 23/046; G01F 23/28; H04N 23/56; G06V 10/754; G06V 10/30

See application file for complete search history.

(56) References Cited

U.S. PATENT DOCUMENTS

| | | | |
|---|---|---|---|
| 2015/0139385 A1* | 5/2015 | Bone | G06T 7/521 378/36 |
| 2016/0131767 A1* | 5/2016 | Fletcher | G01T 7/00 250/336.1 |
| 2018/0011195 A1* | 1/2018 | Perry | G06F 17/10 |
| 2019/0162520 A1* | 5/2019 | Shaked | G01B 11/2441 |
| 2019/0206070 A1* | 7/2019 | Nash | G06T 7/33 |
| 2020/0134773 A1 | 4/2020 | Pinter et al. | |
| 2020/0209604 A1* | 7/2020 | Chen | G02B 21/14 |
| 2021/0103049 A1* | 4/2021 | Blanche | G01S 13/003 |

OTHER PUBLICATIONS

Marvin A. Schofield, Yimei Zhu; "Fast phse unwrapping algorithm for interferometric applications," Optics Letters, vol. 28, No. 14 (2003) 1194-1196.

* cited by examiner

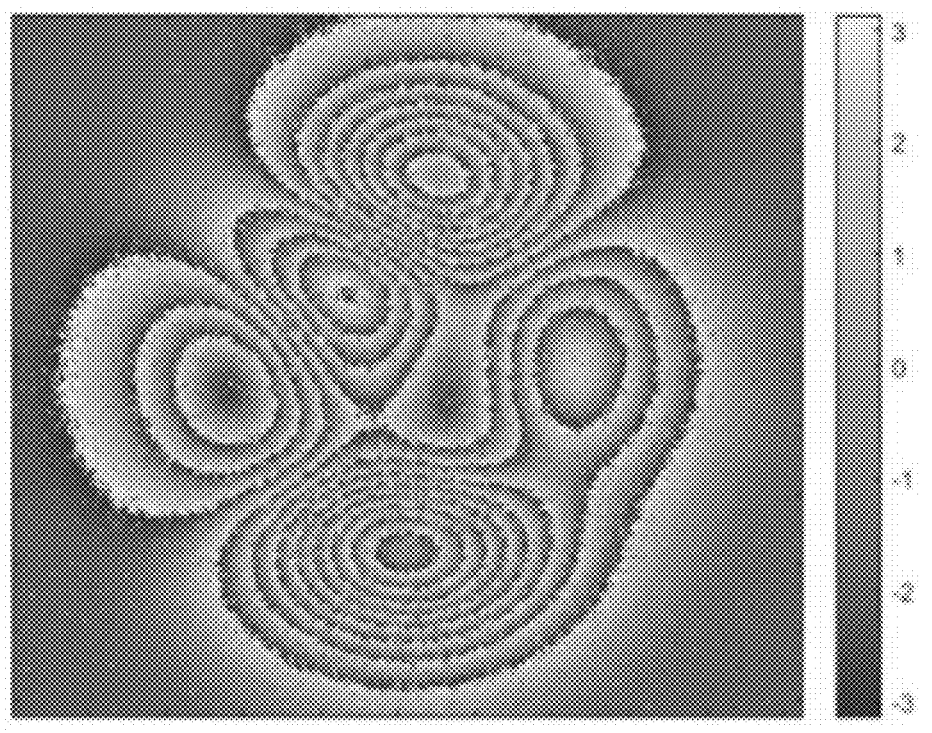
FIG. 1
FIG. 3
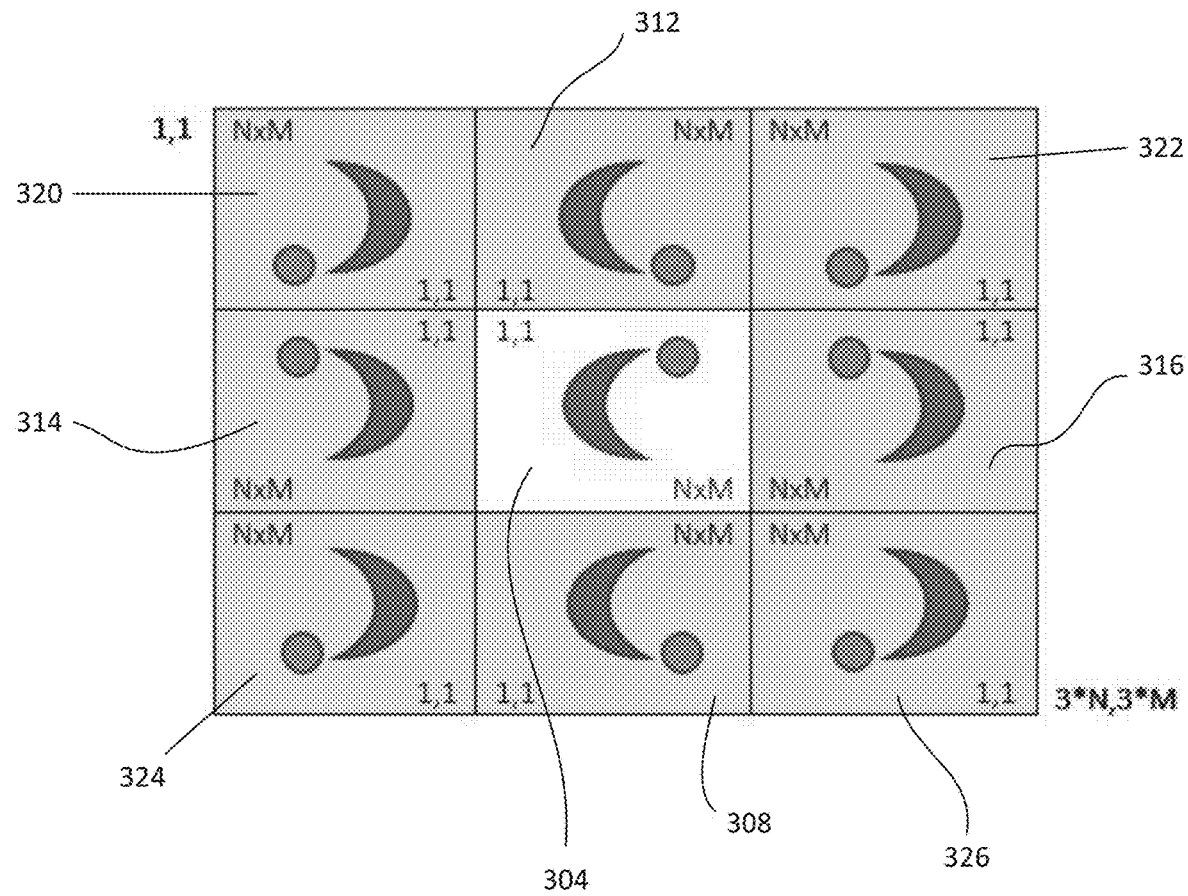

Example 1: *Noise-Free Wrapped Phase*

Laplacian $\quad \hat{k}(x,y) = \frac{1}{2\pi} \nabla_{\perp}^{-2} \left[ Im \left\{ \left( \frac{1}{P(x,y)} \nabla_{\perp}^{2} P(x,y) \right) \right\} - \nabla_{\perp}^{2} \phi_w(x,y) \right]$ Scaling $\hat{k}(x,y) \quad k(x,y) = s_{L,min} * \hat{k}(x,y)$ Unwrapped Phase $\quad \phi(x,y) = \phi_w(x,y) + s * \frac{1}{2\pi} \nabla_{\perp}^{-2} \left[ Im \left\{ \left( \frac{1}{P(x,y)} \nabla_{\perp}^{2} P(x,y) \right) \right\} - \nabla_{\perp}^{2} \phi_w(x,y) \right]$

Example 2: *Noisy Wrapped Phase*

$$\phi_W^V(x,y) = SD - ROM(\phi_W(x,y));$$

Denoising $$\phi_W^{NF}(x,y) = 2D\ \text{Wiener}(\phi_W^V(x,y));\ \text{Filter Size}\ [11,11]$$

Laplacian $$\hat{k}(x,y) = \frac{1}{2\pi}\nabla_L^{-2}\left[Im\left\{\left(\frac{1}{P(x,y)}\nabla_L^2 P(x,y)\right)\right\} - \nabla_L^2 \phi_W^{NF}(x,y)\right];$$

$$P(x,y) \propto \phi_W^{NF}(x,y)$$

Scaling $\hat{k}(x,y)$ $$k(x,y) = s_{L,min} * \hat{k}(x,y)$$

FLED $$\phi_W^L(x,y) = B(x,y)\phi_W^{NF}(x,y) + F(x,y)$$

Updated Laplacian $$\hat{k}(x,y) = \frac{1}{2\pi}\nabla_L^{-2}\left[Im\left\{\left(\frac{1}{P(x,y)}\nabla_L^2 P(x,y)\right)\right\} - \nabla_L^2 \phi_W^L(x,y)\right];$$

$$P(x,y) \propto \phi_W^L(x,y)$$

Scaling $\hat{k}(x,y)$ $$k(x,y) = s_{L,min} * \hat{k}(x,y)$$

Unwrapped Phase $$\phi(x,y) = \phi_W^L(x,y) + s * \frac{1}{2\pi}\nabla_L^{-2}\left[Im\left\{\frac{1}{P(x,y)}\nabla_L^2 P(x,y)\right\} - \nabla_L^2 \phi_W^L(x,y)\right]$$

FIG. 6

Example 3: *High Noise or Background Wrapped Phase*

| Step | Equation |
|---|---|
| Quality Map | $\phi_W^Q(x,y) = \phi_w(x,y)\, Q(x,y)$ |
| Denoising | $\phi_W^i(x,y) = SD - ROM\left(\phi_W^Q(x,y)\right)$; <br> $\phi_W^{NF}(x,y) = $ 2D Wiener$(\phi_W^i(x,y))$; Filter Size $[11,11]$ |
| Laplacian | $k(x,y) = \dfrac{1}{2\pi}\nabla_\perp^{-2}\left[Im\left\{\left(\dfrac{1}{P(x,y)}\nabla_\perp^2 P(x,y)\right) - \nabla_\perp^2 \phi_W^{NF}(x,y)\right\}\right]$ |
| Scaling $k(x,y)$ | $P(x,y) \propto \phi_W^{NF}(x,y)$ <br> $k(x,y) = s_{l,min} * k(x,y)$ |
| FLED | $\phi_W^l(x,y) = B(x,y)\phi_W^{NF}(x,y) + F(x,y)$ |
| Updated Laplacian | $k(x,y) = \dfrac{1}{2\pi}\nabla_\perp^{-2}\left[Im\left\{\left(\dfrac{1}{P(x,y)}\nabla_\perp^2 P(x,y)\right) - \nabla_\perp^2 \phi_W^l(x,y)\right\}\right]$ |
| Scaling $k(x,y)$ | $P(x,y) \propto \phi_W^l(x,y)$ <br> $k(x,y) = s_{l,min} * k(x,y)$ |
| Unwrapped Phase | $\phi(x,y) = \phi_W^l(x,y) + s * \dfrac{1}{2\pi}\nabla_\perp^{-2}\left[Im\left\{\left(\dfrac{1}{P(x,y)}\nabla_\perp^2 P(x,y)\right) - \nabla_\perp^2 \phi_W^l(x,y)\right\}\right]$ |

FIG. 7

$\phi_w(x,y)$ [1024:1024] $\qquad$ $\nabla\phi_w(x,y)$ [500:800,700:1024]
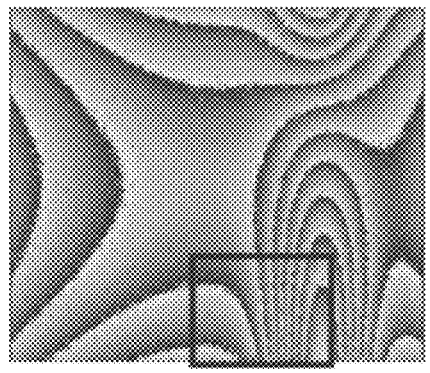 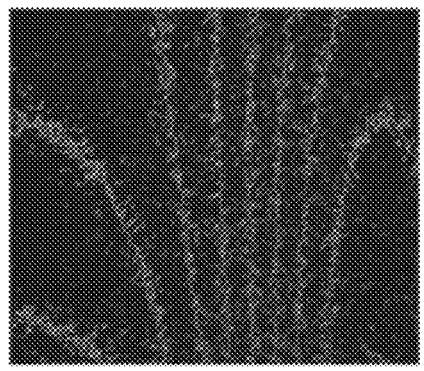
FIG. 8A (Noisy)
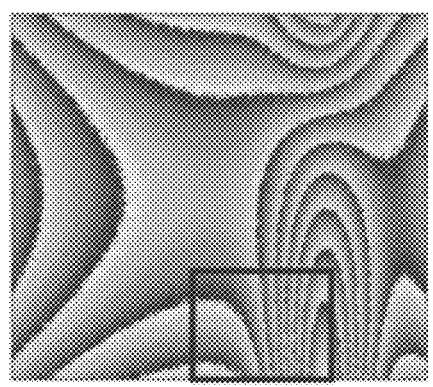 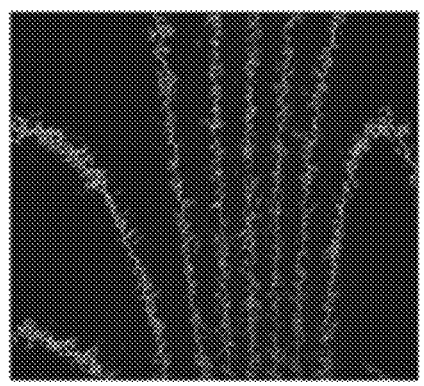
FIG. 8B (Wiener)
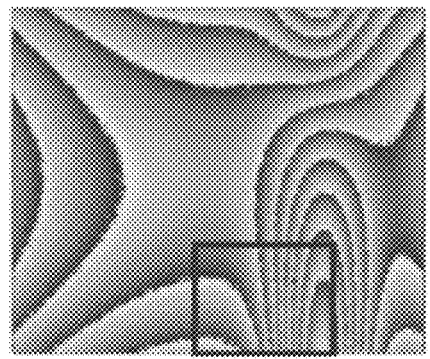 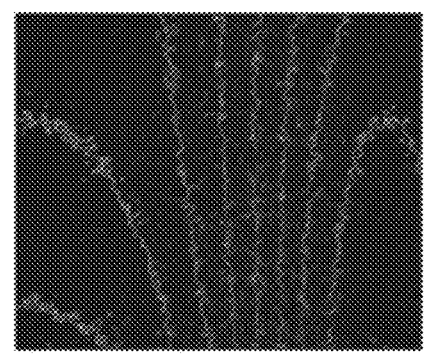
FIG. 8C (SD-ROM)
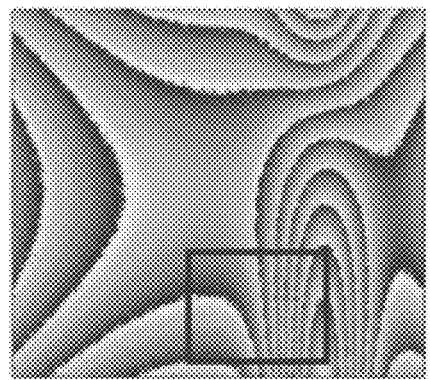 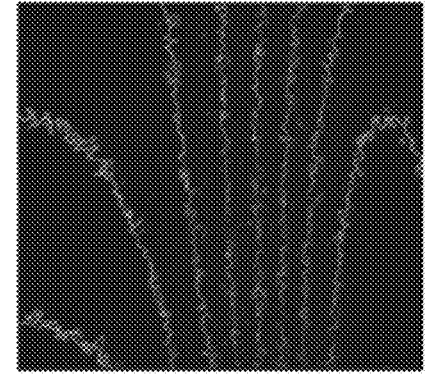
FIG. 8D (SD-ROM + Wiener)

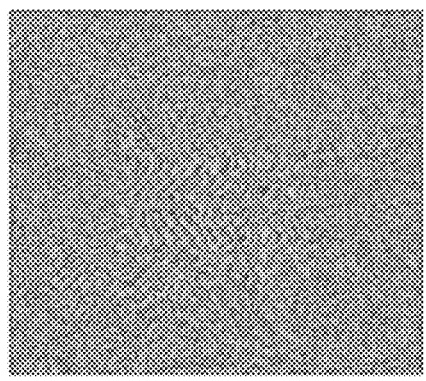  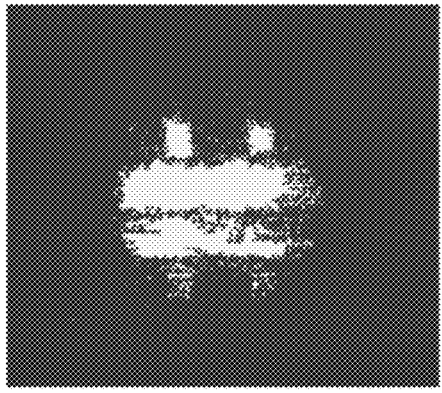 
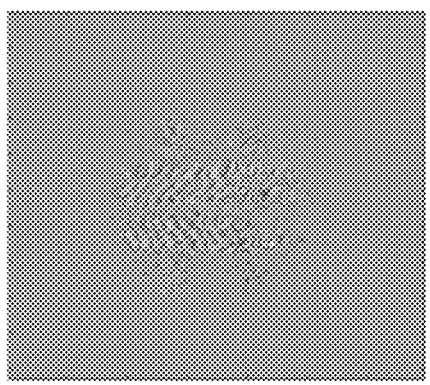  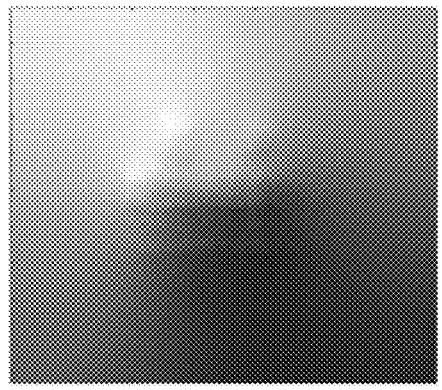 
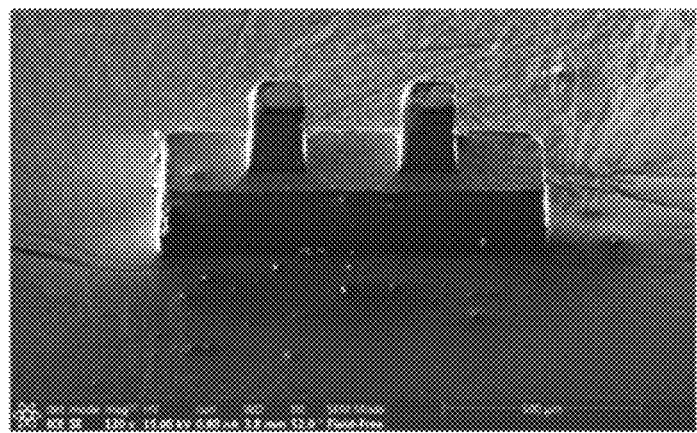
FIG. 10A   FIG. 10B   FIG. 10C   FIG. 10D   FIG. 10E

DETERMINATION OF A TRUE SHAPE OF AN OBJECT BASED ON TRANSFORMATION OF ITS OPTICAL IMAGE

CROSS-REFERENCE TO RELATED APPLICATIONS

This US Patent Application is a national phase of the International Patent Application No. PCT/US2021/056972, filed Oct. 28, 2021 and published as WO 2022/103587 on May 19, 2022, which claims priority from the U.S. Provisional Patent Application No. 63/111,294 filed on Nov. 9, 2020. The disclosure of each of the above-identified patent applications is incorporated herein by reference for all purposes.

STATEMENTS AS TO INVENTION MADE UNDER FEDERALLY SPONSORED RESEARCH AND DEVELOPMENT

This invention was made with government support under Grant No. N00014-14-1-0505, awarded by NAVY/ONR and Grant No. N68335-19-C-0521, awarded by NAVY/WC. The government has certain rights in the invention.

RELATED ART

Parameters of an optical image of an object, acquired with the use of an appropriately chosen optical imaging system, are very often defined insufficiently precisely for correct determination of the shape of the object. One example of this problem is presented by a situation in which the object's shape changes not only spatially rapidly (that is, has a steep spatial gradient) but also spatially significantly (that is, by a large amount). Consider, for example, an object represented by a series of steps—surfaces the separation between which substantially exceeds the wavelength of light used to image such steps and tied together by walls that are very steep (say, substantially vertical). In this case, not only the phase distribution of a wavefront of light reflected from such object experiences a change of multiple number of $2\pi$ between the neighboring steps, but such change occurs on a very short spatial scale (that is, the gradient of phase change is high). Understandably, however, even in absence of spatial separation between the different spatial levels of the object, the phase detection methodologies remain limited in that acquired phase is assessed not as an absolute value but within a range or interval repeating with a modulus of $2\pi$. Add to that noise produced due to imperfections or corruption of the used image acquisition system and often observed at least along the boundary separating different regions (fringes) of $2\pi$-modulus-based distribution of phase, and the resulting noisy phase-image of the optical signal acquired by the imaging system (see FIG. 1, for example, in which the amount of Gaussian noise is characterized by the standard deviation value of $\sigma=3$) hardly provides any clear demonstration of what the true shape of the object is like. Judicious modification of such phase-images may lead to the removal of the systemic noise and transformation of the fringes into continuous distribution (that is, unwrapping the phase of the wavefront characterizing the object) thereby allowing the user to determine the true shape of the corresponding object.

The unwrapping of wrapped phase signals (laying typically in the interval of $[-\pi, \pi]$) that are corrupted by noise and/or phase-based residues due to faulty image acquisition techniques, sensors, or noisy media, has proven to be a major obstacle for methodologies of related art that include, for example, region, path following, or global phase unwrapping algorithms reliable phase retrieval: none of the methods of related art are known to handle a high degree of noise and defective fringe patterns necessary for reliable phase retrieval.

The application of the solution to this ever-persisting imaging problem is of use in a variety of fields including medical imaging with-magnetic resonance imaging; interference-based, label-free, digital holographic microscopy; topological surveying—with interferometry synthetic aperture radar (InSAR) images; image reconstruction with fringe projection profilometry; and a more recently introduced application of an interferometry-based radar emulation system where the imaging modalities ultimately produce wrapped phase signals.

SUMMARY

Embodiments of the invention manifest in a global phase unwrapping methodology aimed at minimizing the difference between the true phase and unwrapped phase gradients using a spectral differentiation technique.

The idea of the present invention stems from the realization that assessment of the true shape of the object requires, in addition to denoising of the image (which denoising procedure should be performed in a specifically-ordered fashion), a transformation of the denoised phase-image of the object is required that does not exclude either the odd functions or the even functions (representing the phase-image in the Fourier space) from appropriate processing.

As a result, problems caused by the practically inevitable acquisition of the phase of the object optical wavefront in the form of a noisy phase distribution wrapped with a period of $2\pi$ (in the process of phase-shifting interferometric optical imaging procedure) are resolved by transforming the (preliminarily optionally denoised, if necessary) wrapped phase-image of the object into a transformed phase-image by periodically extending the wrapped phase-image in the plane of the image along two mutually-perpendicular axes in both directions along each of the axes.

Accordingly, an embodiment of the invention includes a method for deriving topology on an object. Such method includes a step of spatially-symmetrically extending a first wrapped phase-image of an optical wavefront (that has been received from the object through an optical imaging system) to form a second extended wrapped phase-image. Here, the first image (or first phase-image) represents a spatial distribution of a phase of the optical wavefront and contains first and second phase fringes and a discontinuous boundary between the first and second phase fringes, across which boundary phase changes by a value having a modulus of $2\pi$. In addition, here the second phase-image includes a two-dimensional array of sub-images. Such two-dimensional array of sub-images in at least one specific embodiment necessarily has an odd number of columns and the odd number of rows. A central sub-image of the two-dimensional array of sub-images is the first image, while each of sub-images is in the columns and rows of the array are axially-symmetric to an immediately-adjacent sub-image about a boundary shared by the two immediately adjacent sub-images. The method additionally includes a step of modifying the second image in Fourier space to define an image corrector (with spatial dimensions that are equal to spatial dimensions of the first phase-image) based at least on a Laplacian transformation of the first phase-image. The method additionally includes a step of producing a report (which report contains at least one of a visually-perceivable representation of shape of the object) by spatially aligning the image corrector with the first phase-image and comparing the visually-perceivable representation and the first phase-image.

In substantially every implementation of the method, the step of comparing may utilize a one-dimensional plot displaying the spatial distribution of the phase of the optical wavefront in a wrapped form and a spatial distribution of the phase of the optical wavefront in an unwrapped form.

In at least one implementation of the method, the step of producing the report may include forming a third phase-image that represents a continuous spatial distribution of the phase of the optical wavefront by adding the image corrector to the first phase-image on a pixel-by-pixel basis. Here, such process of forming is configured such that there exists a one-to-one correspondence between pixels of the image corrector and pixels of the first phase-image. Here, furthermore, the third phase-image is devoid of (that is, lacks) phase discontinuities within boundaries of such third image.

Additionally or in the alternative, and substantially in any implementation, the method may include a step of forming the first phase-image based on at least four interferograms of the object acquired with the use of a phase-shifting interferometer or an interferometry-based radar emulation system; and/or the first phase-image may include phase noise wrapped with a period (having a modulus) of $2\pi$, in which case the method may include a step of denoising the first phase-image (prior to the step of spatially-symmetrically extending such first image) by performing at least one of the following transformations of the first phase-image: (a) modifying phase values of pixels of the first phase-image by reducing noise corresponding to such pixels while, at the same time, preserving a gradient of phase distribution across the first phase-image; (b) removing speckle-like noise from those pixels of the first phase-image that possess the speckle-like noise; (c) removing noise that is based on gradient distribution of the phase in the first phase-image; and (d) determining positions of edges of phase-fringes in the first phase-image.

In the latter case (that is, when the step of denoising the first phase-image is undertaken), the embodiment of the method is configured to satisfy at least one of the following conditions: when the above-identified step (c) is performed, step (a) necessarily precedes any and every other denoising step of the method; when the above-identified step (d) is performed, such step (d) is necessarily the last step in an overall sequence of denoising steps of the method; and step (b) precedes step (a).

Alternatively or in addition, and in substantially every implementation of the method, a two-dimensional image of the object formed with such is configured to represent a spatially-continuous distribution of phase of the optical wavefront, wherein such distribution is differentiable.

Embodiments of the invention additionally provide a computer program product for use on a computer system for determining topology of an object according to the disclosed methodology. Such computer program product includes a computer-usable tangible non-transitory storage medium having computer-readable program code thereon, and the computer-readable program code includes: (a) program code for spatially extending a first wrapped phase-image of an optical wavefront received from the object through an optical imaging system into a second extended wrapped phase-image configured as a two-dimensional array of images each of which corresponds to the first wrapped phase-image (here, the two-dimensional array of images in at least one embodiment necessarily has an odd number of columns and the odd number of rows, and each of the images of the array of images in the columns and rows is symmetric to an immediately-adjacent image of the array of images about a boundary shared by such images of the array; (b) program code for using at least on forward and inverse Laplacian transformations of the first wrapped phase-image to modifying the second extended wrapped phase-image in Fourier space to define a phase corrector that has spatial dimensions respectively equal to spatial dimensions of the first wrapped phase-image; and (c) program code for generating a third phase-image, which represents to an unwrapped distribution of the phase of the optical wavefront, by adding the phase corrector to the first wrapped phase-image on a pixel-by-pixel basis, wherein there is a one-to-one correspondence between pixels of the phase corrector and pixels of the first wrapped phase-image. Alternatively or in addition, the computer program product may include program code for producing a report containing at least one of a visually-perceivable representation of a shape of the object based on the third phase-image and/or have the program code for spatially extending a first wrapped phase-image to be configured to form the two-dimensional array of images in which the first wrapped phase image is necessarily an image at a center of said two-dimensional array. Alternatively or in addition, and substantially in every implementation, the computer program product may include program code for generating a third phase image that is configured to multiply the phase corrector by a predetermined factor prior to adding the phase corrector the first wrapped phase-image to avoid a discontinuity of the phase corrector at boundaries between constituent images of the two-dimensional array of images and/or program code for reducing a level of a phase noise in the first wrapped phase-image prior to said spatially extending the first wrapped phase-image, when the first wrapped phase-image includes the phase noise wrapped with a period having the modulus of $2\pi$, by performing at least one of the following steps (a) modifying phase values of pixels of the first wrapped phase-image by reducing noise corresponding to the pixels while, at the same time, preserving a gradient of phase distribution across the first phase-image; (b) removing speckle-like noise from those pixels of the first wrapped phase image that possess the speckle-like noise; (c) removing noise that is based on a gradient distribution of the phase in the first wrapped phase-image; and (d) determining positions of edges of phase-fringes in the first wrapped phase-image.

Embodiments additionally provide a computer implemented method for determining topology of an object imaged with the use of an optical imaging system. Such method the steps of (a) generating, with the computer, a two-dimensional array of images each of which corresponds to a wrapped phase-image of an optical wavefront received at an optical detector from the object through the optical imaging system (here, the two-dimensional array of images has an odd number of columns and the odd number of rows, and each of the images of the array of images in the columns and rows of the array is symmetric to an immediately-adjacent image of the array of images about a boundary shared by such images of the array); (b) transforming, with the computer, with the use of at least on forward and inverse Laplacian operators the first wrapped phase-image to modify the two-dimensional array of images in Fourier space to define a phase corrector; and (c) generating, with the computer, an image of an unwrapped distribution of the phase of the optical wavefront, by adding the phase corrector to the wrapped phase-image on a pixel-by-pixel basis, wherein there is a one-to-one correspondence between pixels of the phase corrector and pixels of the wrapped phase-image.

BRIEF DESCRIPTION OF THE DRAWINGS

The idea and scope of the invention will be more fully understood by referring to the following Detailed Description in conjunction with the not-to-scale Drawings, in which, to the degree possible, similar elements are indicated with the similar numbers and labels, and in which:

FIG. 1 provides an example of a highly-noisy wrapped phase image (phaseogram).

FIG. 3 illustrates the principle of symmetric spatial extension of the wrapped phase-image of the object to form a spatially-extended wrapped phase-image possessing specific symmetric properties.

FIG. 4 contains a table summarizing all (including optional) steps of the process of determination of the true shape of the object according to an embodiment employed when the wrapped phase of the empirically-acquired image of the object is substantially noise-free.

FIG. 5A illustrates the analysis windows used in the SD-ROM option of image transformation according to an embodiment of the invention.

FIG. 5B illustrates the SD-ROM recursive sliding analysis window w(n), according to an embodiment of the invention.

FIG. 6 summarizes image-transformation operations that may be included into the image-denoising procedure when the Fuzzy Logic filter is used, according to one embodiment of the invention.

FIG. 7 summarizes image-transformation steps that may be included into the image-denoising procedure when both the Fuzzy Logic filter and the Quality Map filter are used, according to one embodiment of the invention.

FIGS. 8A, 8B, 8C, and 8D depict data representing a simulated noisy phaseogram (that is a phase image) containing added speckle noise with the standard deviation of $\sigma=0.5222$. The first column of each Figure labeled $\phi_W(x, y)$ contains a corresponding 1024×1024 image of the wrapped phaseogram resulting from no denoising image transformation (FIG. 8A); the application of 2D Wiener filtering using an [11,11] window size (FIG. 8B), the application of a SD-ROM filter (FIG. 8C), and the image transformation utilizing both the SD-ROM and the 2D Wiener filtering(FIG. 8D). The "square boundary" in each of Figure of this first column identifies the regions of interest presented in the second column of each Figure, which column contains respectively-corresponding 300×324 images of the gradients of the wrapped phraseograms $\nabla\phi_W(x, y)$ with images that have undergone the same image-transformation denoising treatment(s) t as their column one counterparts.

FIG. 9C illustrates the ideal unwrapped phase distribution across the image place. The panels in second columns of FIGS. 9A, 9B contains respective images of noisy phaseograms with $\sigma=0.5222$ simulated noise. Here, the noise is not removed and, instead, the initial (input) noisy phaseogram is processed with the phase unwrapping methodology according to an embodiment of the invention (FIG. 9B). Similarly, the third columns of FIGS. 9A, 9B contain a noisy wrapped phase distributions that have been transformed with the used of the combination of the SD-ROM and 2D Wiener filters, and the filtered wrapped phaseogram was then processed with the phase unwrapping methodology according to an embodiment of the invention (FIG. 9B).

FIGS. 10A, 10B, 10C, 10D, and 10E illustrate image transformation starting with the optical image data (phase data, phaseoghram) obtained experimentally in a recent radio-frequency emulator study. Here, phase information displayed in FIG. 10A was retrieved from optical signals scattered by the object of interest, using a Twyman-Green interferometer configuration of FIG. 2. The phase distribution of FIG. 10A contains a very high degree of noise. Here the QM filtering (FIG. 10B), along with the SD-ROM and 2D Wiener filtering (FIG. 10C) was implemented to generate a noise-filtered wrapped phaseogram. A skilled person can observe that the recovered phaseogram (FIG. 10D) unwrapped according to the embodiment of the invention closely resembles the shape of the actual object (FIG. 10E).

Generally, the Drawings provide schematic depictions only, and the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

As used in this disclosure, and unless specifically defined otherwise, the term "wavefront" refers to and defined as a locus of points in space (a surface) where the wave at hand has the same phase. In the example involving a lightwave, the optical wavefront a wavefront is an essential parameter in the propagation of light and can be used to characterize optical surfaces, align optical assemblies or help to improve the performance of optical systems. In a couple of instances, the spherical wavefront refers to such spatial distribution of light in which the points with the same phase are forming a spherical surface, while the planar wavefront signifies that the iso-surface of the phase distribution is a plane.

The term "image" refers to and is defined as an ordered representation of detector signals (and/or data representing such signals) corresponding to spatial positions. For example, an image may be an array of values within an electronic memory, or, alternatively, a visual image may be formed on a display device X such as a video screen or printer. In another example, visually perceivable representations of a spatial distribution of phase, amplitude, and/or irradiance of an optical wavefront form corresponding images.

The term "topology" as used herein refers generally to a shape of a thing at hand (a real object being optically imaged, for example).

A function is defined as being differentiable with respect to its variable if a derivative of such function with respect to such variable exists and can be determined at each point in the domain of the function. In other words, the graph of the differentiable function has a non-vertical tangent line at each interior point in the domain of the function.

Section 1. Embodiments of Acquisition and Transformation of Phase-Image of the Object to Obtain a Transformed Image Representing True Shape of the Object.

Figure 2:
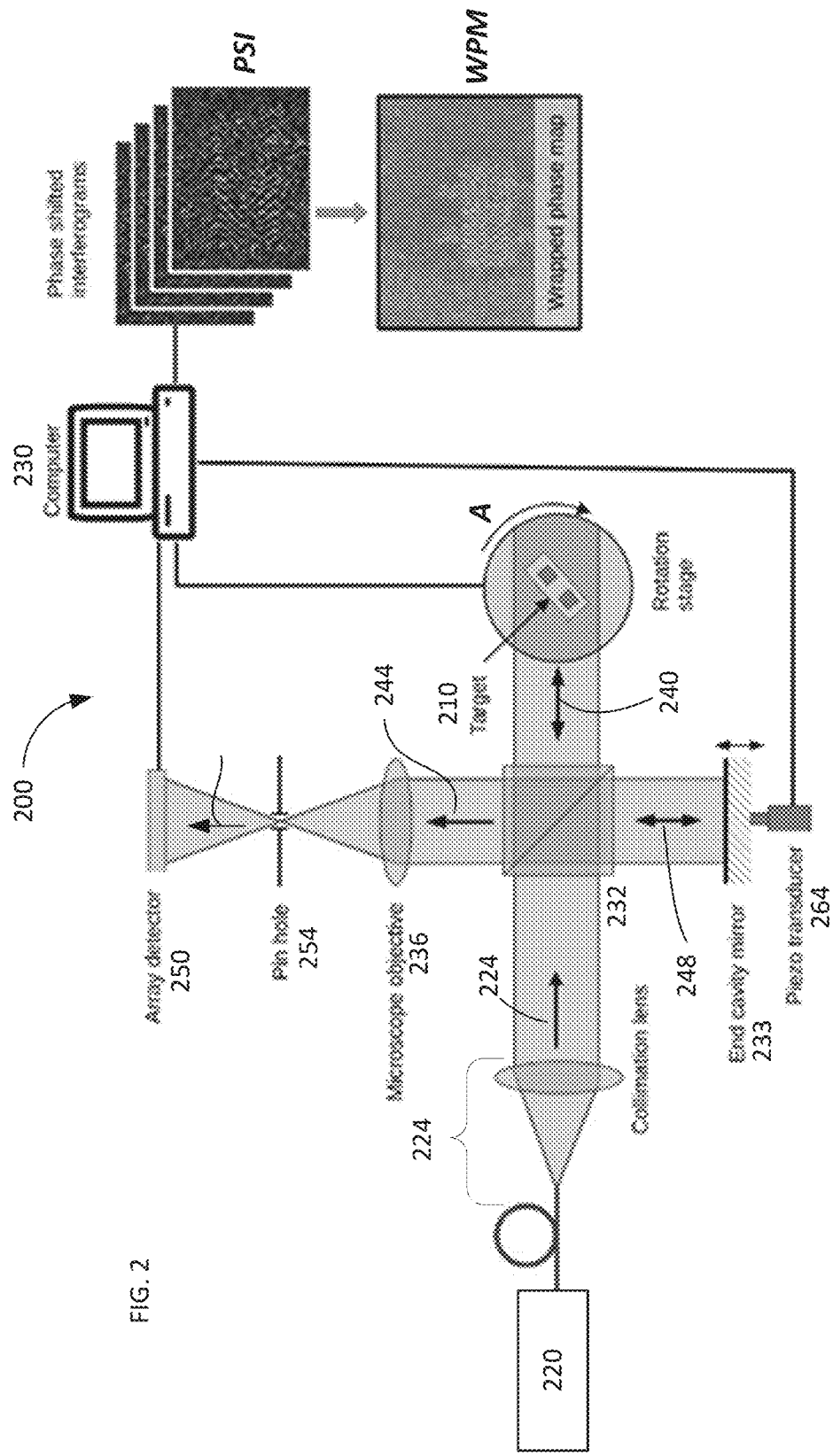
FIG. 2 schematically illustrates an embodiment of the interferometer-based optical system for direct measurement of phase of an optical wavefront received from the target object.

The process of empirical acquisition of the initial image of the object may include the acquisition of the plurality (generally—of at least four, generally, as known in the art) interferograms formed at the optical detector with the use of an optical interferometer-based imaging system (or a radar emulation system), one non-limiting example of which is described in reference to FIG. 15 of the U.S. Pat. No. 10,983,297, the entire disclosure of which is incorporated herein by reference. Such imaging system is schematically shown in FIG. 2. Here, as shown, a reference beam (wavefront) interferes with the object beam (wavefront) at the detector location, and a moving end cavity mirror is used to image multiple interferograms possessing phase shifts with respect to one another.

Light output from the 1064 nm laser source 220 (operating, depending on the specific measurement, in either a CW mode or a pulsed mode) was spatially expanded and collimated from a fiber output, with the use of the collimator module 224. A 1.064 µm wavelength approximately corresponds to a 100,000-scale factor of a 3 GHz (central s-band) radar signal. A 50/50 beam splitter (BS) 232 may be used to divide the collimated beam 224 between the reference and object arm of the interferometer.

The reference arm of the interferometer was defined by a reflector 230 configured to be spatially-repositionable (as shown—with the use of the transducer 264). The target model 210 is placed in the reference arm and imaged (in a light beam 244 representing spatially-overlapped object beam, 240 returned to the BS 232 by the target 210, and reference beam 248, returned to the BS 232 by the reflector 233) using the microscope objective 235 and a 2D CCD array 250. The target 210 may be aligned to the illumination beam and the imaging system using a 6-axis stage. A computer-controlled rotation stage can be used to set the azimuth angle and allows for an automated sweeping and phase mapping at a set elevation. A 2-mm pinhole 254 may be additionally disposed—for example, substantially at the focal plane of the objective 236—to ensure that only on-axis light was imaged by the detector, thereby blocking/removing ant stray light from each of interferograms acquired at the detector 250. A set of phase-shifted with respect to one another interferograms PSI are then recorded with the use of the programmable processor (electronic circuitry, or PC) 230. The required phase shift between sequential interferograms PSI is generated by repositioning the reflector 233 with a piezoelectric transducer (PZT) 264 to change the optical path length of the reference beam by λ/4 (although in related embodiments a different, smaller phase-shift increment can be used). In order to retrieve the phase, at least four interferograms with phase shifts are required. The use of phase-shifting as applied to optical interferometry is commonly used in the art, and for that reason is not discussed here in any detail.

Overall, as a result of multi-step phase-shifted acquisition, with the optical imaging system, of the optical wavefront arriving from the object of interest, we possess several interferograms that are phase-shifted with respect to one another. Here, the initially-acquired phase portion of such interferograms displays the combination (of useful phase signal and noise, if present) that is wrapped—that is, both the noise and the signal are wrapped in the acquired phase images.

The aim of phase unwrapping is to efficiently and accurately unwrap the wrapped phase-image, the phaseogram (and when the noise is present indeed, the additional goal is to reduce the wrapped noise—if present as a result of optical imaging of the object—while preserving the wrapped phase signal prior to phase unwrapping, that is to obtain the denoised wrapped signal, prior to phase unwrapping). Consider the true phase of an image $\phi(x, y)$, and its wrapped phase $\phi_W(x, y)$, both dependent on the spatial domain, where pixels $(x,y) \in N$. The relationship between the true phase image $\phi(x, y)$ and the wrapped phase image $\phi_W(x, y)$ of the object can be described via Eq. (1):

$$\phi(x, y) = \phi_W(x, y) + 2\pi k(x, y); k \in \mathbb{Z}; \qquad (1)$$

where it is assumed that $\phi_W(x, y)$ is wrapped in the following manner $\phi_W(x, y) = \hat{W}[\phi(x, y)]$, and $\hat{W}$ is the wrapping operator: $\hat{W} = \mathrm{mod}\{[\pi + \phi(x, y)], 2\pi\} - \pi$. Here, "mod" represents the modulo operation that returns the remainder or signed remainder of a division, after one number is divided by another (called the modulus of the operation).

The transformation of the phase-image relied on in implementing an embodiment of the invention is rooted in the assumption that the desired unwrapped and the wrapped phraseograms have the same, smooth, local phase differences; i.e. the phase gradients in the intervals $[-\pi; \pi]$ are equal. Therefore, the goal of phase unwrapping is, essentially, to determine the integer values of $k(x, y)$.

This can be accomplished by evaluating the gradients of both the wrapped and unwrapped phase using the forward and inverse two-dimensional Laplacian operators $$k(x, y) = \frac{1}{2\pi} \nabla_T^{-2} \left[ \nabla_T^2 \phi(x, y) - \nabla_T^2 \phi_W(x, y) \right] \qquad (2)$$

The use of spectral differentiation methods, such as Fast-Fourier Transform (FFT) differentiation, can reduce the computational complexity associated with solving Eq. (2). Indeed-Recall that $f(x) = \int_{-\infty}^{\infty} dx\, F(\xi) \exp(2\pi i \xi x)$ and, via the shifting theorem, $f'(x) = \int_{-\infty}^{\infty} dx\, 2\pi i \xi\, F(\xi) \exp(2\pi i \xi x)$. Using this identity, one can rewrite the Laplacian operators as follows in Equations (3):

$$\nabla_{\perp}^2 f(x, y) = -\frac{4\pi^2}{N \times M} \mathcal{F}^{-1}\{(p^2 + q^2) \mathcal{F}[f(x, y)]\} \qquad (3)$$

$$\nabla_{\perp}^{-2} g(x, y) = \frac{-N \times M}{4\pi^2} F^{-1}\left\{\frac{\mathcal{F}[g(x, y)]}{(p^2 + q^2)}\right\};$$

Here, $(x,y) \in \mathbb{N}$ and $(p,q) \in \mathbb{N}$ are the real and the momentum space pixel coordinates, and N×M is the area of the interferogram.

Note that to obtain $k(x,y)$, the unwrapped phase must be known a priori, see Eq. (2). However, by defining the complex quantity $\exp(i\phi_W(x, y))$ and considering that $\exp(i\phi_W(x, y)) = \exp(i\phi(x, y) + 2\pi k(x, y)) = \exp(i\phi(x, y))$, one can define the following:

$$P(x, y) = \exp(i\phi_W(x, y)) \nabla_{\perp}^2 \phi(x, y) = \mathrm{Im}\left\{\left(\frac{1}{P(x, y)} \nabla_{\perp}^2 P(x, y)\right)\right\} \qquad (4)$$

and to arrive, with the use of Eq. (2), at the following solution proposed for use in unwrapping the phase of the optical image and expressed as Equations (5):

$$\phi(x, y) == \nabla_\perp^{-2}\left[\text{Im}\left\{\left(\frac{1}{P(x, y)}\nabla_\perp^2 P(x, y)\right)\right\} - \nabla_\perp^2 \phi_w(x, y)\right] + \phi_w(x, y); \quad (5)$$

$$\text{Where } k(x, y) = \frac{1}{2\pi}\nabla_\perp^{-2}\left[\text{Im}\left\{\left(\frac{1}{P(x, y)}\nabla_\perp^2 P(x, y)\right)\right\} - \nabla_\perp^2 \phi_w(x, y)\right]$$

Therefore, the true, spatially-continuous unwrapped phase-image of the optical wavefront imaged with the chosen optical imaging system can now be determined with the use of the a phase corrector (or, a correcting phase-image) k(x,y) which is determined with the use of at least forward and inverse Laplacian operators and the spatial dimensions of which are equal to those of the wrapped phase-image itself: the values of phase distribution of such phase corrector are added, on a pixel-by-pixel basis, to the values of the acquired wrapped phase image.

Now, according to the idea of the invention, instead of using pixel coordinates in the Fourier domain, the corresponding modified momentum space values can optionally be used, shown below as Equations (6):

$$x_m = \left\{\frac{-N}{2}, \frac{N}{2}, N\right\}; y_m = \left\{\frac{-M}{2}, \frac{M}{2}, M\right\} \quad (6)$$

$$\xi_m = \left\{\frac{-1}{2\Delta x_m}, \frac{1}{2\Delta x_m}, N\right\}; \eta_m = \left\{\frac{-1}{2\Delta y_m}, \frac{1}{2\Delta y_m}, M\right\}$$

Here, the modified momentum space values ($\xi_m$, $\eta_m$) are bounded on the corresponding intervals as shown above, with N, M being the number of indices.

Accordingly—based on Eqs (3)—

$$\nabla_\perp^2 f(x, y) = -\frac{4\pi^2}{N \times M}\mathcal{F}^{-1}\{(\xi_m^2 + \eta_m^2)\mathcal{F}[f(x, y)]\} \text{ and} \quad (7)$$

$$\nabla_\perp^{-2} g(x, y) = \frac{-N \times M}{4\pi^2}F^{-1}\left\{\frac{\mathcal{F}[g(x, y)]}{(\xi_m^2 + \eta_m^2)}\right\};$$

It is these forms of Laplacians that can now be used in determining the values of k(x,y) as per Equation (2).

According to an embodiment of the invention, the actual process of phase-unwrapping is implemented not with the use of the originally-acquired wrapped phase-image but with the use of the judiciously modified, transformed phase-image. To this end, the process of phase-image transformation—and, specifically, of transformation of the subject wrapped phase-image (wrapped phase map, or WPM) representing the experimentally-acquired spatial distribution of phase of the interferometrically-formed wavefront 244—necessarily involves a step of spatially-extending the subject phase-image symmetrically in both directions in the plane of the image to generate a new phase-image that contains a 2D-array of the subject phase-images such that the original phase-image is spatially surrounded with the newly-formed phase images (that is, borders newly-formed images in any direction, x or y) and thus is disposed in the center of the 2D-array of such phase-images. In other words, the phase unwrapping is performed on the wrapped phaseogram the periodicity of which is increased or extended from 2N×2M to 3N×3M to meet the Neumann boundary conditions at every boundary of the wrapped phaseogram. A person of skill in the art will readily understand that in the newly-formed 2D-array-shaped spatially-extended phase-image, each constituent sub-image is axially-symmetric to that sub-image with which is shares the boundary, about such boundary. The concept is schematically illustrated in FIG. 3, showing the spatially-extended (transformed) image 300 containing the subject phase-image 304 (N×M pixels) and the judiciously-formed spatial extensions (sub-images) 306, 308, 312, 314, 316 of the subject phase-image 306, as well as the spatial extensions 320, 322 of the constituent sub-image 312 and the spatial extensions 324, 326 of the constituent sub-image 308. The subject phase-image 304 shares at least a portion of its boundary with each and every of the spatially-extended sub-images. Taken as a whole, the 2D array 300 of constituent sub-images is but a new, transformed subject phase-image (wrapped with the period/modulus of 2π)

The phase-image 300 includes a phaseogram of the interferometrically formed wavefront 244 the spatial periodicity of which has been extended in both directions while maintaining the Neumann boundary conditions at every boundary of such wrapped phaseogram. As shown, the transformed image represents a 3×3 array of sub-images, but in related implementations the transformed image can be generate, generally speaking, as a (2k+1)×(2k+1) array of sub-images, where k is a positive integer. In contradistinction with related art, however, the so symmetrically two-dimensionally transformed phase image contains the initial, subject phase-image in the center of the 2D array—and not in a corner of it—thereby allowing the processing of even functions in the Fourier space.

Since the phase corrector k(x,y) must be an integer value, sin(πk(x, y))=0 for all k(x,y). However, as was discovered in practice, the presence of discontinuities that cannot be accounted for via the applied Neumann boundary conditions tends to generate minor scaling effects observed in the values of k(x, y) and produce unwanted rounding errors in the recovered unwrapped phaseogram when k(x, y) is sufficiently close to n+/−0.5, n ∈ ℤ. This additional problem was solved, according to the idea of the invention, by applying a scaling factor to recover the expected k(x,y) values by minimizing the number of image pixels for which the sin(πk(x, y)) values are not zero. (The skilled artisan will readily appreciate that such scaling, in practice, remains optional and does not principally change the outcome while, at the same time improving the final results if so desired.)

In other words, the image transformation step following the spatial extension of the wrapped phase-image discussed above may optionally include passing the spatially-extended wrapped phase-image through the Fourier domain-based procedure to determine the locations of 2π phase-discontinuities of such image. According to this step of image transformation, the global scaling factor $S_{i,min}$ is determined by finding the local minimum of the following function:

$$f_i(x, y) = \sum_{x=1}^{M}\sum_{y=1}^{N}\text{abs}(\sin(\pi\tilde{k}(x, y) * s_i); i \in \mathbb{Z} \quad (8)$$

and the value(s) of k(x,y) determined with the use of Eq. (2) and the following Equations as discussed above may be additionally scaled/multiplied by such global scaling factor. Notably, the periodic nature of the sin(πk(x, y)*s), wherein scaling s≈2 yields≈sin(πk(x, y)*s), therefore the local scaling minima should be found in the region i≈[−2,2]. (In practice, most scaling values in both the simulated and experimental data found that the scaling value was between i=[0.8, 1.3].)

Thus, when the additional scaling factor is taken into account to ensure that there are no spatial discontinuities between phase-fringes in the acquire phase-image of the object, the final phase distribution of the acquired image that represents the true shape of the object and that is unwrapped, according to the idea of the invention, over the extended spatial area can be obtained as $$\phi(x, y) = \phi_w(x, y) + s * \frac{1}{2\pi} \nabla_\perp^{-2} \left[ \text{Im} \left\{ \frac{1}{P(x, y)} \nabla_\perp^2 P(x, y) \right\} - \nabla_\perp^2 \phi_w(x, y) \right] \quad (9)$$

It can be seen, therefore, that the output—after return to the phase-domain—is represented by a specifically-defined Laplacian of the original wrapped phase image, as per the Equation above. FIG. 4 provides a summary of the image-transformation steps included in one implementation of the phase unwrapping procedure, according to which the true shape of the imaged object is determined based on the optical image containing substantially no noise.

Section 2. Embodiments of Optional De-noising of Phase-Image of the Object When Required.

A person of skill in the art will appreciate that if and when the initially-acquired subject wrapped phase-distribution includes a substantial amount of noise, however, such wrapped phase distribution could—and preferably, should—be first denoised—prior to the transformations of the phase-image that amount to phase-unwrapping. (The lower is the level of noise in the optical image prior to the determination of the true shape of the object, the more accurately such shape is determined.) To this end, and if so desired, according to embodiments of the invention the noisy wrapped phase-image may be preliminarily modified with the judicious and specifically-configured use of at least some the following noise-removing image-transforming operations or filters, which are discussed in detail elsewhere in this disclosure:

(2a) A Wiener filter, which is configured to at least reduce substantially all types of noise and—in case the noise is not impulse-like—to preserve phase gradient (that is, preserve phase fringes in the image keeping them discrete from one another: since the Laplacian, used later at the Fourier-processing step of the phase-image transformation, relies on phase gradient as discussed above, as much of phase gradient as possible should preferably be preserved).

(2b) A SD-ROM filter, which is configured to remove point-like (speckle-like, impulse-like) noise. A person of skill will readily appreciate that the implementation of this image-transforming step amounts substantially to taking the "mean" of the pixel-field including the surrounding pixels and substituting such mean-based value instead of the impulse noise value in the chosen pixel, to produce the outcome characterized by the (noise+signal) distribution that has continuous (and/or monotonous) first and second derivatives along both axes of the 2D wrapped noisy phase image. Accordingly, in practice of implementation of at least one specific embodiment of the invention, the denoising process that involves both the use of the SD-ROM and Wiener filters necessarily applies the SD-ROM first (to remove the impulse-like-noise) and only then, with the impulse-noise substantially removes, uses the Wiener filter to preserve the fringes.

(2c) A Quality Map (QM) filter that is configured to remove noise based on gradient distribution and preserves only information contained in those phase-image pixels the value of which is characterized by low variability. Essentially, the use of the QM-based image transformation amounts to the desired removal of noise accompanied by the unwanted removal of the useful signal of phase gradient—which is generally counterintuitive and conventionally is not performed. However, when the amount of noise is substantial—and when the noise is present across most of the FOV—the use of the QM filter may be, nevertheless, desired despite and against the conventional point of view. In this case, however, the use (that is, the application) of QM to the phase distribution data should precede the use of any other denoising filter, and in at least one specific implementation of the invention necessarily precedes the use of any other denoising filter operation.

(2d) A Fuzzy Logic Edge Detection (FLED) filter may also be utilized to assess the spatial location(s) of the edge(s) of the phase fringe(s) across the image plane.

Therefore, in at least one implementation of an embodiment of the image denoising according to the idea of the invention—and when each and every of the above-identified noise-removal filters are utilized—the order of the filter use is necessarily as follows: the QM filter (which is not used if the noisy phase-image occupies a smaller-then-predetermined portion of the overall FOV), then the SD-ROM filter, then the Wiener filter, and only then Fuzzy logic filter. At the output of this phase-image transformation, the de-noised wrapped phase-image is produced that is now subject to the symmetric spatial extension as discussed above.

To this end, FIG. 6 summarizes the sequence of image-transformation operations that may be included into the image-denoising procedure and the phase-unwrapping procedure when the Wiener filter and Fuzzy Logic filter are used, according to one embodiment of the invention. FIG. 7 illustrates a related non-limiting example by providing a summary of image-transformation steps that may be included into the image-denoising transformation and the phase-unwrapping image transformation when the Fuzzy Logic filter and the Quality Map filter and the Wiener filter are employed.

Now the above-identifies optional image-transformation denoising procedures are described in some detail.

Noise Reduction with a Wiener Filter

Images and signals are often corrupted by noise due to faulty image acquisition techniques/sensors. Although noisy phraseograms can be handled by the spectral differentiation technique proposed above, the degree of noise often becomes a limiting factor in calculating the Laplacian of the wrapped phase especially when the wrapped phase contains clusters of impulse noise near or at the [−π, π] boundary. Widely available filters such as the 2-D Median and Wiener filters provide a satisfactory approach for the removal of noise from images; however, such filters modify pixel values whether or not they are corrupt. For most cases improvement on the local phase gradient can be observed, hence the wide implementation of the 2D Median and Wiener filters in phase unwrapping algorithms, however when clusters of impulses are present in the wrapped phaseogram the filter can ultimately distorting or blurring features surrounding the cluster, leading to an unreliable wrapped phase gradients. To circumvent this problem, it is important to first remove corrupted pixels and subsequently apply a filter. The SD-ROM filter provides such capabilities.

Application of a SD-ROM Filter

Briefly, the SD-ROM filter is an efficient non-linear filter that suppresses highly impulse corrupted images whilst preserving uncorrupted pixels. Consider x(n), the luminescence value of a noisy image [0, 255]; where (n) refers to the pixel location (x,y) in the wrapped noisy phaseogram. Surrounding x(n), is a 3×3 window of pixels, denoted as w(n), where w(n) consists of pixels w((n)=[w$_1$(n), w$_2$(n), w$_3$(n), . . . , w$_8$(n)]; where w((n), i=[1,8], i ∈ $\mathbb{Z}$; corresponds to a left to right, top to bottom mapping of the pixels surrounding x(n), see FIG. 5A. The pixels found in w(n) can be rank-ordered r$_(i$(n)=[r$_1$(n), r$_2$(n), r3(n), . . . , r$_8$(n)]; in ascending order such that r$_1$(n)≤r$_2$(n)≤r$_3$(n)≤, . . . , ≤r$_8$(n). Thereafter, the rank-ordered mean of the window w(n) can be found, where $$m(n) = \frac{r_4(n) + r_5(n)}{2} \quad (10)$$

Finally, the rank-ordered differences within the window w(n) can be found; where, d(n)=[d$_1$(n), d$_2$(n), d$_3$(n), d$_4$(n)]. The values pertaining to d$_j$(n), j=[1,4], j ∈ $\mathbb{Z}$; are designated with the following rule:

$$d_j(n) = \begin{cases} r_j(n) - x(n) & \text{for } x(n) \le m(n) \\ x(n) - r_{9-j}(n) & \text{for } x(n) > m(n) \end{cases} \quad (11)$$

The SD-ROM filter detects impulse noise using four thresholding values, namely T$_j$=[1,4], j ∈ $\mathbb{Z}$. If dJ(n)>TJ then the pixel x(n) is considered corrupt. Notably, T$_1$<T$_2$<T3<T4. In at least one implementation, the algorithm performed well for values of T$_1$=8, T2=20, T$_3$=40, T4=50, however, the thresholding values can be modified on a case by case basis for a priori knowledge of the impulse magnitude (suggested thresholds limits are as follows: T$_1$≤15,15≤T$_2$≤25, 30≤T$_3$≤50,40≤T$_4$≤60. If a given pixel is corrupt, the pixel value x(n) is changed to y(n)=m(n). This algorithm can be applied recursively, where the window w(n) slides through the images (left to right, top to bottom) replacing corrupt x(n) for y(n) see FIG. 5B., or non-recursively where corrupt pixels value modifications are not considered in the sliding window and are stored in memory to be replaced after the algorithm has analyzed the entire input signal. Note that if the wrapped phaseogram contains non-impulse noise or the impulse noise has been removed, the 2-D Wiener filter can be utilized to smooth the phase gradients present in the signal. The use of the SD-ROM filter based transformation of the phase-image to remove impulse clusters should be applied prior to the use of a 2D Wiener filter (to reduce non-impulse like noise in the wrapped phaseogram, as per Equations (12) and (13) presented immediately below):

$$\phi_W^y(x, y) = \text{SD-ROM}(\phi_W(x, y)) \quad (12)$$

$$\phi_W^{NF}(x, y) = \text{2D-Wiener}(\phi_W^y(x, y)); \text{Filter Size [11, 11]} \quad (13)$$

Quality Map Filter

Global phase unwrapping algorithms, specifically those using spectral methods, are robust enough to deal with phaseograms containing a significant amount of noise. However, quality maps are often mplemented to remove unwanted pixels from highly distorted or noisy wrapped phaseogram and improve the accuracy and efficiency of phase unwrapping algorithms. Quality maps significantly improve phase unwrapping of an image containing a wrapped phase signal and a wrapped phase background. Pertaining to the phase unwrapping algorithm demonstrated above, implementing Phase Derivative Variance (PDV) to assess pixel quality has been shown to improve the unwrapping of noisy wrapped phaseogram. Where each pixel's 'quality' R(x, y) is determined by the variance of the pixel's phase derivative according to Equation C:

$$R(x, y) = \frac{\left(\sqrt{\sum_{i=x-\frac{n}{2}}^{x+\frac{n}{2}} \sum_{j=y-\frac{m}{2}}^{y+\frac{m}{2}} (\Delta_{i,j}^x - \Delta_{x,y}^{-x})^2} + \sqrt{\sum_{i=x-\frac{n}{2}}^{x+\frac{n}{2}} \sum_{j=y-\frac{m}{2}}^{y+\frac{m}{2}} (\Delta_{i,j}^x - \Delta_{x,y}^{-y})^2}\right)}{(n \times m)} \quad (14)$$

Here, n and m correspond to the window size with the center pixel (x, y); the terms $\Delta_{i,j}^x$ and $\Delta_{i,j}^y$ 5 are the partial derivatives of the phase. The terms $\Delta_{x,y}^{-x}$ and $\Delta_{x,y}^{-y}$ are the averages of the partial derivatives in the n×m window. Thereafter, a moderate threshold is applied (Equation D immediately below), where pixels with quality>T are kept:

$$Q(x, y) = \begin{cases} 0 & \text{for } R(x, y) < T \\ 1 & \text{for } R(x, y) \ge T \end{cases} ; \quad (15)$$

Here T is to be considered a threshold value between R(x, y)=0 and max(R(x, y)). It is noted that in at least one implementation of the method the thresholding value of 0.9 was used to obtain, per Equation (16), $$\phi_W^Q(x, y) = \phi_W(x, y) Q(x, y) \quad (16)$$

Note, it is suggested that the PDV filtered wrapped phaseogram Q(x, y)P(x, y) be used before the application SD-ROM and 2-D Wiener filter if a high degree of noise is present or if the wrapped signal is present within a wrapped noisy background (as discussed below in reference to FIGS. 10A-10E). In at least one implementation of the method, the use of the Quality Map filter necessarily precedes the use of any other filter.

Fuzzy Logic based Edge Detection (FLED)

For special cases where the fringes of a wrapped phaseogram are highly corrupted, where noise processing cannot produce reliable fringes, unwrapping the phaseogram and obtaining a reliable k(x, y) becomes difficult. However, upon unwrapping, a reliable boundary between regions with differing k(x, y) is possible. This condition makes it possible to reconstruct the boundary of the noisy wrapped phaseogram by estimating the location of the corrupted [−π, π] boundaries. Here it is suggested that the $\nabla_x 2\pi k(x, y)$ and $\nabla_y 2\pi k(x, y)$ at the boundaries between successive k(x, y) should differ greatly from the gradients within the k(x, y) region; where regions inside the k(x, y)≈0 and gradients at successive k(x, y) should ideally be 2π or at minimum>0 when k ∼(x, y)≠k(x, y). Using this condition (and taking advantage of MATLAB's Fuzzy Logic App, for example) one can recover the location of the wrapped phase [−π, π] discontinuities. The following parameters were utilized to estimate the wrapped phase discontinuity locations. For regions where $\nabla_x 2\pi k(x, y)$ or $\nabla_y 2\pi k(x, y)$ are zero, the Fuzzy Logic Routine associates a value of 1, indicative of non-edge-like surfaces. For regions where $\nabla_x 2\pi k(x, y)$ or $\nabla_y 2\pi k(x, y)$ are>>zero, the Fuzzy Logic Routine associates a value of 0, indicative of edge-like-surfaces. The Fuzzy Logic Routine then determines the probability of a pixel lying with an edge by utilizing a weighted value function. Parameters $S_X$ and $S_Y$ are used to determine the number of standard deviations away from $\nabla_y 2\pi k(x, y)=0$ or $\nabla_y 2\pi k(x, y)=0$ that should be considered non-edge-like boundaries, triangle functions then determine the weighted values of pixels that lie within $S_X$ and $S_Y$ and their likelihood of convergence towards an edge-like boundary. The parameters utilized in one specific example are shown Once the weighted value function I(x,y) is recovered, a binary mask can be created in concordance with the fuzzy logic parameters, where, according to Equation (17):

$$B(x, y) = \begin{cases} 0 & \text{for } I(x, y) < 0.5 \\ 1 & \text{for } I(x, y) \geq 0.5 \end{cases} \quad (17)$$

Pixel values re-assignment along the mask can also be computed, where, per Equation (18):

$$F(x, y) = \begin{cases} -\pi & \text{for } I(x, y) \geq 0.5; \phi_w(x, y) < 0 \\ 0 & \text{for } I(x, y) < 0.5 \\ \pi & \text{for } I(x, y) \geq 0.5; \phi_w(x, y) > 0 \end{cases} \quad (18)$$

Upon determining the boundary mask and the boundary condition values, the wrapped phase noise-free wrapped phase is updated according to Equation (19):

$$\phi_w^J(x, y) = B(x, y)\phi_w^{NF}(x, y) + F(x, y) \quad (19)$$

and run through the phase unwrapping image-transformation as discussed above once more.

Section 3: Examples of Implementation of Image Transformation by Noise Removal To assess the degree of noise that was successfully removed via the SD-ROM and/or 2D Wiener based optical image transformations, the gradient maps of the wrapped phaseogram (similar to that obtained experimentally with the use of the measurement set-up of FIG. 2) were inspected. As discussed above, the gradients of the wrapped phaseogram are expected to be zero, or substantially near zero within the [−π, π] boundaries of the phase. Presented in FIGS. 8A, 8B, 8C, and 8D are the wrapped phaseogram, the noise reduction treatment(s), and the gradients at regions featuring both high degrees of noise and fringe density and, specifically, the results produced by the noise-reducing treatments of the chosen input wrapped phaseogram containing σ=0.5222 standard deviations of added speckle noise. The local phase gradients $\nabla\phi_w(x, y)$ in FIG. 8A presents a high degree of discontinuity within the [−π, π] reaching values that are similar to those expected near or at the wrap-ping boundary. (A person of skill will appreciate that this feature makes it particularly difficult to unwrap the phaseogram using the spectral differentiation method as discussed in Section 1 above, see also FIG. 9. for results.) The local phase gradients $\nabla\phi_w(x, y)$ of the wrapped phaseogram upon 2D Wiener filtration, FIG. 8B, feature smooth, near-zero, phase gradients within the [−π, π] region and present the expected gradient values at or near the [−π,π] boundary. However, when compared to the local phase gradients of the SD-ROM filtered phaseogram (FIG. 8C), the 2D-Wiener filter appears to miss impulse like noise near or at the [−π,π] boundaries. This phenomenon can be detrimental to the relative phase unwrapping process, as corrupted wrapped boundaries can lead to unreliable k(x, y) values necessary for phase unwrapping. It is noted that the SD-ROM filter alone substantially fails to remove non-impulse like corrupted data, where the local phase gradients within the [−π,π] region displays some degree of discontinuous behavior. The proposed {SD-ROM+2D-Wiener} filtering mechanism, illustrated in FIG. 5D demonstrates a superior local phase gradient $\nabla\phi_w(x, y)$ mapping, where both impulse and non-impulse like noise has been removed from both the [−π,π] inner and boundary regions. Notably, similar results were obtained from a variety of wrapped noisy phaseogram, see FIG. 10 below. Overall, the use of this particular wrapped noisy phaseogram of FIG. 8A was practically used to demonstrate the effect of noise removal from image regions containing high noise and high densities of wrapped phase fringes.

Section 4: Examples of Image Transformation by Phase Unwrapping According to the Idea of the Invention As was alluded to in Section 1, conventional phase unwrapping methodologies of related art (such as, for example, that discussed by Schofield et al. in "Fast Phase Unwrapping Algorithm for Interferometric Applications." Optics Letters 28.14, 1194-196 (2003) or Shi et al. in "Discussion about the DCT/FFT Phase-unwrapping Algorithm for Interferometric Applications." Optik-International Journal for Light and Electron Optics 121.16, 1443-449; 2010) necessarily employ rounding the k(x, y) value(s) to the nearest integer value to obtain the final unwrapped phaseogram. However, because of the inherent scaling effects incurred by the spectral differentiation technique, k(x, y) cannot simply be rounded to the nearest integer as the resulting image will then incur unwanted rounding error in the final, unwrapped phase signal when k(x, y) approaches n+/−0.5; n ∈ $\mathbb{Z}$. In addition to the critical modification mentioned for pre-processing of the wrapped phaseogram (already discussed in Section 1 as symmetric spatial extension of the wrapped phase-image of the object to form a spatially-extended wrapped phase-image possessing specific symmetric properties) and some post-processing of wrapped/unwrapped phaseogram, an additional major advantageous distinction of an embodiment of the invention from the phase-unwrapping methodologies of related art is the process of k(x, y) estimation, in which it is proposed to use the function sin(πk (x, y))—and not round k(x,y) as prior art does. This idea stems from the realization that the wrapped signal differs from the unwrapped phase signal by 2πk(x, y), where k(x, y) is an integer value, and that the function sin(πk(x, y)) is substantially zero for all k(x, y) given that the unwrapped k(x, y) values are equal to the expected k(x, y). However, in the case when scaling is synthetically introduced into the wrapped phaseogram, k(x, y) will be expected to be non-zero. The scaling procedure was discussed in Section 1 as including the minimization of the global number of non-zero pixels in the sin(πk (x, y)) identity.

Figures 9A, 9B, 9C:
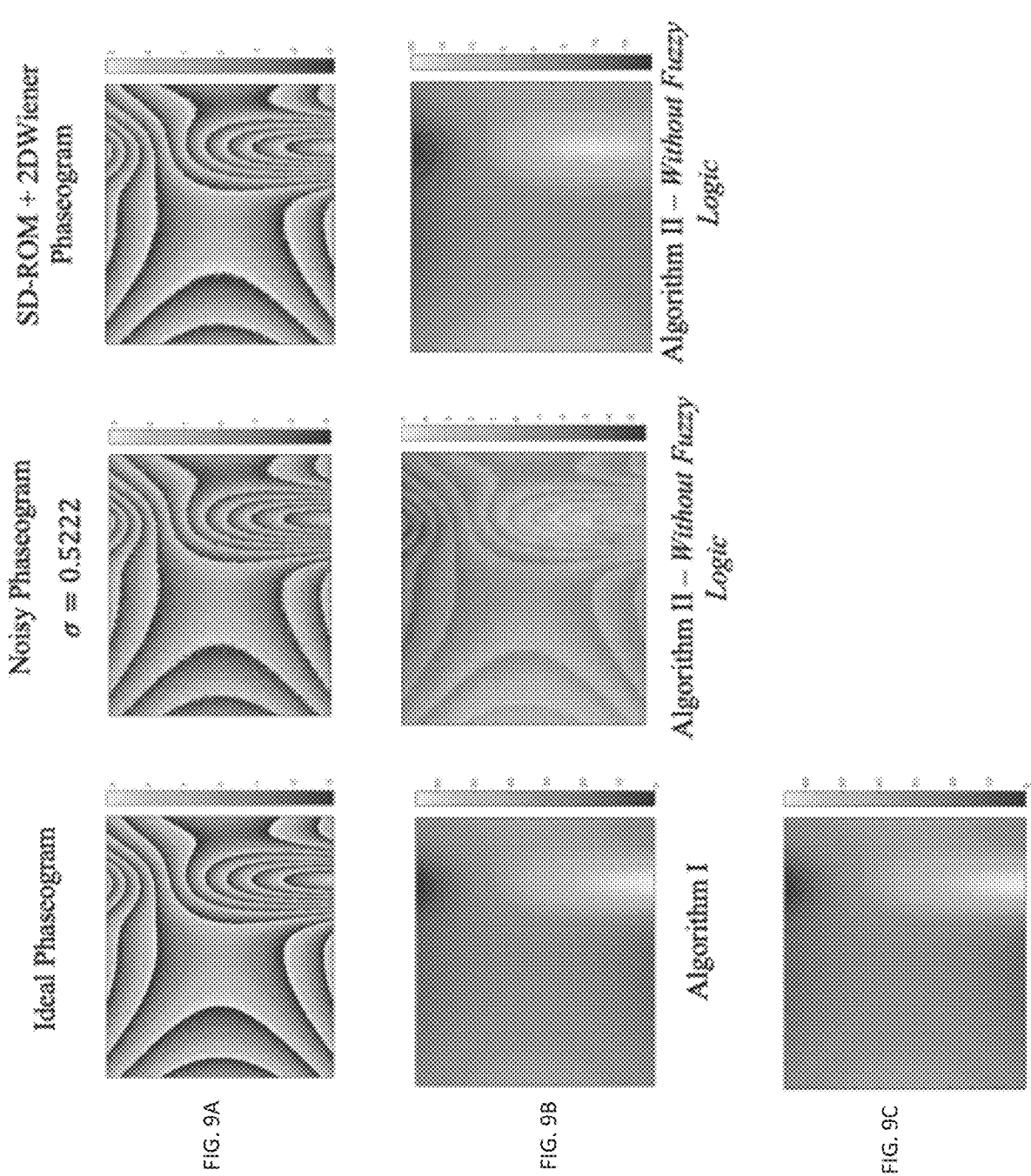
FIGS. 9A, 9B, 9C (in each of corresponding panels) depict data representing the implementation of an embodiment of the invention with the use of a simulated noisy phaseogram containing a $\sigma=0.5222$ standard deviations of added speckle noise. The panels in first columns of FIGS. 9A, 9B—labeled Ideal Phaseogram—contains respective 1024×1024 images of a noise-free phaseogram representing a wrapped noise-free phaseogram (FIG. 9A) and the noise-free phaseogram unwrapped with the use of the proposed herein k(x, y) scaling method (FIG. 9B).

In reference to FIGS. 9A, 9B, and 9C, the implementation of the embodiment of the invention included evaluating the phase unwrapping algorithm for ideal wrapped phase (first columns of FIGS. 9A, 9B), noisy wrapped phase (second columns of FIGS. 9A, 9B), and denoised wrapped phaseogram (third columns of FIGS. 9A, 9B). The noisy wrapped phaseogram used for comparison included σ=0.5222 standard deviations of added speckle noise and had areas of relatively high fringe densities. Notably, that the scaling k(x, y) phase unwrapping methodology used to obtain the results depicted in FIGS. 9A, 9B with the use of the embodiment of the algorithm of Example 1 (Noise-Free Phase Unwrapping) of FIG. 4 and the algorithm of Example 2 (Noisy Phase Unwrapping) did not use (that is excluded) Fuzzy Logic Edge Detection filter as the purpose of this phase-unwrapping exercise was to solely assess the phase unwrapping performance. The comparison of the results of FIG. 9B with the results provided by the Schofield and Shi algorithms were also performed (not shown here), and demonstrated that—in contradistinction to the successful unwrapping of phase with the use of the embodiment of the invention, the Shofield and the Shi algorithms struggled to unwrap the ideal wrapped interferogram, with notable jumps and dips in phase, coming from the conventionally-utilized rounding of the k(x, y) values. The noisy and noise filtered wrapped phaseogram are challenging to unwrap because of the discontinuous local phase gradients $\nabla\phi_W(x, y)$ as well as the corrupt wrap boundaries. From the results shown in FIGS. 9A-9C the skilled artisan can conclude that an embodiment of the phase-unwrapping image transformation of the invention performs better with the SD-ROM and/or 2D Wiener filter based denoising (and notably the proposed scaling of the k(x, y) approach qualitatively outperformed the Schofield and Shi algorithms in all three tests).

FIGS. 10, 10B, 10C, 10D, and 10E present the results of the implementation of the embodiment of the invention to extract a true shape of the object from the image (acquired with the use of the set-up of FIG. 2, as discussed for example in U.S. 10,983,207, the disclosure of which is incorporated herein by reference) that contained very high level of noise coming from the imaging source, experimental setup, and/or background. The optical image data (phase data, phaseogram) was obtained experimentally in a recent radio-frequency emulator study. Here, phase information displayed in FIG. 10A was retrieved from optical signals scattered by the object of interest, using a Twyman-Green interferometer configuration of FIG. 2. The phase distribution of FIG. 10A contained a very high degree of noise. Here, the embodiment of the denoising and phase-unwrapping methodology summarized in FIG. 7 was implemented. Specifically, the level of noise was reduced with the used of the QM filtering (FIG. 10B), along with the SD-ROM and 2D Wiener filtering to generate a noise-filtered wrapped phaseogram (FIG. 10C). The phaseogram (phase-image) of FIG. 10D was recovered by unwrapping that of FIG. 10C with the use of the unwrapping methodology of the invention. The comparison between the phase distribution of FIG. 10E and the shape of the actual object (presented in FIG. 10E) demonstrates the workability of the embodiment of the invention and shows that the implementation summarized in Example 3 of FIG. 7 successfully handles the phase unwrapping, denoising, and edge detection for the very high noise wrapped phaseogram of FIG. 10A. It is noted, as before, that the thresholding parameters established for the Fuzzy Logic Edge Detection routine remained unchanged.

The skilled artisan having the advantage of reading this disclosure will readily appreciate that image transformation with the use of unwrapping of the spatial distribution of phase of the image in the presence of noise and unreliable fringes poses a difficult problem. With the use of the proposed embodiments of a multi-pronged approach to successfully unwrap 2D-distributed signals—namely, the optional use of at least SD-ROM based denoising and/or FLED based fringe quality improvement as well as the judiciously structured spatial extension of the wrapped phaseogram and the use of reliable k(x,y) estimation—the overall process of recovery of the true shape of the object has low computational and implementational complexity and has many variable parameters in both the denoising and FLED routines, making it well suited for a variety of complex phase unwrapping cases.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

While specific values chosen for the discussed embodiment are recited, it is to be understood that, within the scope of the invention, the values of all of parameters may vary over wide ranges to suit different applications. While the invention is described through the above-described exemplary embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. A method for assessing topology on an object, the method comprising:
    transforming a first wrapped phase-image of an optical wavefront received from the object through an optical imaging system into a second extended wrapped phase-image configured as a two-dimensional array of images,
        wherein the first wrapped phase-image represents a spatial distribution of a phase of the optical wavefront and contains first and second phase fringes and a discontinuous boundary between the first and second phase fringes, wherein the phase changes by a value having a modulo of $2\pi$ across said boundary, wherein each of the images of the two-dimensional array of images is an image corresponding to the first wrapped phase image, wherein the two-dimensional array of images has an odd number of columns and an odd number of rows, wherein each of the images of the two-dimensional array of images in said columns and rows is symmetric to an immediately-adjacent image of the two-dimensional array of images about a boundary shared by such images of the two-dimensional array of images;

based at least on forward and inverse Laplacian transformations of the first wrapped phase-image, modifying the second extended wrapped phase-image in Fourier space to define a phase corrector that has spatial dimensions respectively equal to spatial dimensions of the first wrapped phase-image; and forming a third phase-image representing an unwrapped distribution of the phase of the optical wavefront by adding the phase corrector to the first wrapped phase-image on a pixel-by-pixel basis, wherein there is a one-to-one correspondence between pixels of the phase corrector and pixels of the first wrapped phase-image.

2. The method according to claim 1, further comprising producing a report containing at least one of a visually-perceivable representation of a shape of the object based on the third phase-image.

3. The method according to claim 1, wherein said transforming a first wrapped phase-image includes forming the second extended wrapped phase-image in which the first wrapped phase-image is necessarily an image located in a center of the two-dimensional array of images and is surrounded by other images of the two-dimensional array of images from every side thereof.

4. The method according to claim 1, further comprising multiplying the phase corrector by a predetermined factor to avoid a discontinuity of the phase corrector at boundaries between constituent images of the two-dimensional array of images.

5. The method according to claim 1, wherein the third phase-image is substantially devoid of discontinuities of a phase distribution.

6. The method according to claim 1, comprising:
forming the first wrapped phase-image based on at least four interferograms of the object acquired with the use of a phase-shifting interferometer or an interferometry-based radar emulation system.

7. The method according to claim 1, comprising:
when the first wrapped phase-image includes phase noise wrapped with a period having the modulus of $2\pi$, reducing a level of the phase noise in the first wrapped phase-image prior to transforming the first wrapped phase-image by performing at least one of the following denoising steps:

(7a) modifying phase values of pixels of the first wrapped phase-image by reducing noise corresponding to said pixels while, at the same time, preserving a gradient of phase distribution across the first wrapped phase-image;

(7b) removing speckle-like noise from those pixels of the first wrapped phase image that possess the speckle-like noise;

(7c) removing noise that is based on a gradient distribution of the phase in the first wrapped phase-image; and (7d) determining positions of edges of phase-fringes in the first wrapped phase-image.

8. The method according to claim 7, wherein at least one of the following conditions is satisfied:

i) when step (7c) is performed, the step (7a) necessarily precedes any and every other denoising step of the method;

ii) when step (7d) is performed, the step (7d) is necessarily the last step in a sequence of the denoising steps of the method; and iii) the step (7b) precedes the step (7a).

9. The method according to claim 2, wherein the visually-perceivable representation includes a plot displaying the spatial distribution of the phase of the optical wavefront in a wrapped form and the spatial distribution of the phase of the optical wavefront in an unwrapped form.

10. A two-dimensional image of the object formed with a method according to claim 1, wherein said image represents a spatially-continuous distribution of the phase of the optical wavefront, wherein such spatially-continuous distribution is differentiable.

11. A computer program product for use on a computer system for determining topology of an object, the computer program product comprising a computer-usable tangible non-transitory storage medium having computer-readable program code thereon, the computer-readable program code including:

program code for spatially extending a first wrapped phase-image of an optical wavefront received from the object through an optical imaging system into a second extended wrapped phase-image configured as a two-dimensional array of images each of which corresponds to the first wrapped phase- image, wherein the two-dimensional array of images has an odd number of columns and an odd number of rows, wherein each of the images of the two-dimensional array of images in said columns and rows is symmetric to an immediately-adjacent image of the two-dimensional array of images about a boundary shared by such images of the two-dimensional array of images;

program code for using at least one of forward and inverse Laplacian transformations of the first wrapped phase-image to modify the second extended wrapped phase-image in Fourier space to define a phase corrector that has spatial dimensions respectively equal to spatial dimensions of the first wrapped phase- image; and program code for generating a third phase-image, by adding the phase corrector to the first wrapped phase-image on a pixel-by-pixel basis, wherein the third phase-image represents an unwrapped distribution of the phase of the optical wavefront, wherein there is a one-to-one correspondence between pixels of the phase corrector and pixels of the first wrapped phase-image.

12. The computer program product according to claim 11, further comprising:
program code for producing a report containing at least one of a visually-perceivable representation of a shape of the object based on the third phase-image.

13. The computer program product according to claim 11, wherein said program code for spatially extending a first wrapped phase-image is configured to form the two-dimensional array of images in which the first wrapped phase-image is necessarily an image at a center of said two-dimensional array of images.

14. The computer program product according to claim 11, wherein said program code for generating a third phase image is configured to multiply the phase corrector by a predetermined factor prior to adding the phase corrector the first wrapped phase-image to avoid a discontinuity of the phase corrector at boundaries between constituent images of the two-dimensional array of images.

15. The computer program product according to claim 11, further comprising:
  program code for reducing a level of phase noise in the first wrapped phase-image prior to said spatially extending the first wrapped phase-image, when the first wrapped phase-image includes the phase noise wrapped with a period having the modulus of $2\pi$, by performing at least one of the following steps:
  (15a) modifying phase values of pixels of the first wrapped phase-image by reducing noise corresponding to said pixels while, at the same time, preserving a gradient of phase distribution across the first wrapped phase-image;
  (15b) removing speckle-like noise from those pixels of the first wrapped phase image that possess the speckle-like noise;
  (15c) removing noise that is based on a gradient distribution of the phase in the first wrapped phase-image; and
  (15d) determining positions of edges of phase-fringes in the first wrapped phase-image.

16. The computer program product according to claim 15, wherein at least one of the following conditions is satisfied:
  i) when the step (15c) is performed, the step (15a) necessarily precedes any and every other denoising step of the method;
  ii) when the step (15d) is performed, the step (15d) is necessarily the last step in a sequence of the denoising steps of the method; and
  iii) the step (15b) precedes the step (15a).

17. A computer implemented method for determining topology of an object imaged with the use of an optical imaging system, the method comprising:
  generating, with the computer, a two-dimensional array of images each of which corresponds to a wrapped phase-image of an optical wavefront received at an optical detector from the object through the optical imaging system,
  wherein the two-dimensional array of images has an odd number of columns and the odd number of rows,
  wherein each of images of the two-dimensional array of images in said columns and rows is symmetric to an immediately-adjacent image of the two-dimensional array of images about a boundary shared by such images of the two-dimensional array of images;
  transforming, with the computer, with the use of at least one of forward and inverse Laplacian operators the first wrapped phase-image to modify the two-dimensional array of images in Fourier space to define a phase corrector; and
  generating, with the computer, an image of an unwrapped distribution of a phase of the optical wavefront, by adding the phase corrector to the wrapped phase-image on a pixel-by-pixel basis, wherein there is a one-to-one correspondence between pixels of the phase corrector and pixels of the first wrapped phase-image.

18. The computer implemented method according to claim 17, further comprising:
  with the computer, reducing a level of phase noise in the first wrapped phase-image prior to said generating, when the first wrapped phase-image includes the phase noise wrapped with a period having the modulus of $2\pi$, by performing at least one of the following steps:
  (18a) modifying phase values of pixels of the first wrapped phase-image by reducing noise corresponding to said pixels while, at the same time, preserving a gradient of phase distribution across the first wrapped phase-image;
  (18b) removing speckle-like noise from those pixels of the first wrapped phase image that possess the speckle-like noise;
  (18c) removing noise that is based on a gradient distribution of the phase in the first wrapped phase-image; and
  (18d) determining positions of edges of phase-fringes in the first wrapped phase-image.

* * * * *